US006896848B1

(12) United States Patent
Warhurst et al.

(10) Patent No.: US 6,896,848 B1
(45) Date of Patent: May 24, 2005

(54) MICROPLATE COVER ASSEMBLY

(75) Inventors: Julian D. Warhurst, Ashland, MA (US); Andrew F. Zaayenga, Martinsville, NJ (US)

(73) Assignee: TekCel, Inc., Hopkinton, MA (US)

( * ) Notice: Subject to any disclaimer, the term of this patent is extended or adjusted under 35 U.S.C. 154(b) by 316 days.

(21) Appl. No.: 09/740,624

(22) Filed: Dec. 19, 2000

(51) Int. Cl.[7] .................................................. B01L 3/00
(52) U.S. Cl. ..................... 422/99; 422/102; 435/305.3; 435/305.4; 206/503; 220/23.6
(58) Field of Search .................... 422/99–104; 206/373, 206/372, 503; 220/4, 23.6; 204/464; 435/288.4, 305.2, 305.4, 305.3

(56) References Cited

U.S. PATENT DOCUMENTS

| | | | |
|---|---|---|---|
| 3,206,017 A | | 9/1965 | Williams ..................... 206/56 |
| 3,302,854 A | | 2/1967 | Midgley et al. .............. 229/43 |
| 3,366,265 A | | 1/1968 | Hesselbarth ............... 220/23.4 |
| 3,674,396 A | * | 7/1972 | McCormick ................ 249/160 |
| RE28,165 E | * | 9/1974 | McCormick ................ 220/229 |
| 3,858,752 A | | 1/1975 | Marvin, Jr. et al. ......... 220/325 |
| 3,883,398 A | * | 5/1975 | Ono ............................ 195/127 |
| 3,910,410 A | | 10/1975 | Shaw ......................... 206/363 |

(Continued)

FOREIGN PATENT DOCUMENTS

| | | | |
|---|---|---|---|
| DE | 3818614 A1 | * 12/1989 | ............ B65D/1/00 |
| EP | 06/45187 A2 | 3/1993 | |
| EP | 0645187 A2 | 3/1995 | |
| EP | 0866119 A2 | 9/1998 | |
| EP | 08/66119 A2 | 9/1998 | |
| WO | WO 95/27196 | * 10/1995 | |
| WO | WO 00/03805 | 1/2000 | |
| WO | WO 01/85550 A2 | 11/2001 | |

OTHER PUBLICATIONS

PCT Notification of Transmittal of the International Search Report or the Declaration, Form PCT/ISA220 (Jul. 1998).
PCT International Search Report, Form PCT/ISA/210 (Jul. 1998).

*Primary Examiner*—Jill Warden
*Assistant Examiner*—Dwayne K Handy
(74) *Attorney, Agent, or Firm*—Cesari and McKenna, LLP

(57) ABSTRACT

A microplate cover assembly which is compatible with manual workstations or robotic handling systems used for high throughput screening. The cover assembly includes a cover, a pressure plate and a layer of sealing material. The cover is shaped such that when it is engaged with a microplate, the cover exerts a compressive force on the pressure plate, which in turn disperses the force in a substantially uniform manner across the layer of sealing material. The cover and pressure plate also include laterally-extending tabs which allow it to be engaged with or disengaged from a microplate in a fully automated fashion.

11 Claims, 6 Drawing Sheets

U.S. PATENT DOCUMENTS

| | | | | |
|---|---|---|---|---|
| 4,038,149 A | * | 7/1977 | Liner et al. | 422/102 |
| 4,246,339 A | | 1/1981 | Cole et al. | 435/7 |
| 4,284,202 A | | 8/1981 | Barstow, Jr. | 220/4 B |
| 4,292,273 A | | 9/1981 | Butz et al. | |
| 4,391,780 A | | 7/1983 | Boris | |
| 4,392,389 A | | 7/1983 | Eckstein et al. | 73/864.91 |
| 4,420,080 A | * | 12/1983 | Nakamura | 206/449 |
| 4,473,168 A | | 9/1984 | Cox | 220/258 |
| 4,493,815 A | | 1/1985 | Fernwood et al. | |
| 4,495,289 A | | 1/1985 | Lyman et al. | |
| 4,569,438 A | | 2/1986 | Sheffler | 206/37 |
| 4,619,363 A | * | 10/1986 | Wolfseder | 206/372 |
| 4,626,509 A | | 12/1986 | Lyman | 435/287 |
| 4,657,867 A | * | 4/1987 | Guhl et al. | 220/374 |
| 4,680,269 A | | 7/1987 | Naylor | |
| 4,704,255 A | | 11/1987 | Jolley | 422/101 |
| 4,777,021 A | | 10/1988 | Wertz et al. | 422/101 |
| 4,847,050 A | | 7/1989 | Jenkins et al. | 422/102 |
| 4,895,706 A | | 1/1990 | Root et al. | 422/102 |
| 4,902,481 A | | 2/1990 | Clark et al. | 422/101 |
| 4,912,057 A | | 3/1990 | Guirguis et al. | |
| 4,927,604 A | | 5/1990 | Mathus et al. | |
| 4,948,442 A | | 8/1990 | Manns | 156/73.1 |
| 4,948,564 A | | 8/1990 | Root et al. | 422/101 |
| 5,011,779 A | | 4/1991 | Maimon | 435/293 |
| 5,038,852 A | | 8/1991 | Johnson et al. | 165/12 |
| 5,047,215 A | | 9/1991 | Manns | 422/101 |
| 5,056,427 A | * | 10/1991 | Sakabe et al. | 100/211 |
| 5,065,885 A | | 11/1991 | Scaroni | 220/326 |
| 5,076,933 A | | 12/1991 | Glenn et al. | 210/641 |
| 5,094,355 A | | 3/1992 | Clark et al. | 220/4.23 |
| 5,104,533 A | | 4/1992 | Szabados | 210/257.1 |
| 5,108,603 A | * | 4/1992 | Schuette | 210/321.72 |
| 5,108,704 A | | 4/1992 | Bowers et al. | 422/70 |
| 5,110,556 A | | 5/1992 | Lyman et al. | 422/101 |
| 5,112,574 A | | 5/1992 | Horton | 422/102 |
| 5,130,105 A | | 7/1992 | Carter et al. | 422/245 |
| 5,133,939 A | | 7/1992 | Mahe | 422/104 |
| 5,141,719 A | | 8/1992 | Fernwood et al. | 422/101 |
| 5,178,779 A | | 1/1993 | Gironda et al. | 210/800 |
| 5,188,963 A | | 2/1993 | Stapleton | |
| 5,219,528 A | | 6/1993 | Clark | 422/101 |
| 5,273,718 A | | 12/1993 | Skold et al. | |
| 5,282,543 A | * | 2/1994 | Picozza et al. | 220/255 |
| 5,342,581 A | | 8/1994 | Sanadi | |
| 5,427,742 A | * | 6/1995 | Holland | 422/102 |
| 5,516,490 A | | 5/1996 | Sanadi | |
| 5,604,130 A | * | 2/1997 | Warner et al. | 220/523 |
| 5,665,247 A | | 9/1997 | Valus et al. | |
| 5,741,463 A | * | 4/1998 | Sanadi | 422/101 |
| 5,780,294 A | * | 7/1998 | Stevens et al. | 422/102 |
| 5,817,509 A | * | 10/1998 | Stevens et al. | 435/297.5 |
| 5,854,065 A | * | 12/1998 | Livingston et al. | 435/288.3 |
| 5,856,176 A | * | 1/1999 | Mathus et al. | 220/755 |
| 5,863,792 A | * | 1/1999 | Tyndorf et al. | 435/297.5 |
| 5,882,922 A | * | 3/1999 | Tyndorf et al. | 215/258 |
| 5,928,934 A | * | 7/1999 | McCormick | 425/117 |
| 5,935,277 A | * | 8/1999 | Autenrieth et al. | 48/127.9 |
| 6,027,694 A | | 2/2000 | Boulton et al. | |
| 6,126,191 A | * | 10/2000 | Pepperine et al. | 280/728.2 |
| 6,159,368 A | * | 12/2000 | Moring et al. | 210/258 |
| 6,204,051 B1 | * | 3/2001 | Copeland et al. | 435/288.3 |
| 6,251,662 B1 | | 6/2001 | Day | |
| 6,254,833 B1 | * | 7/2001 | Shumate et al. | 206/503 |
| 6,258,325 B1 | * | 7/2001 | Sanadi | 422/101 |
| 6,372,144 B1 | * | 4/2002 | Vassarotti | 210/650 |
| 6,426,050 B1 | | 7/2002 | Pham et al. | 422/104 |
| 6,426,215 B1 | * | 7/2002 | Sandell | 435/305.3 |
| 6,429,008 B1 | * | 8/2002 | Copeland et al. | 435/303.2 |
| 6,436,351 B1 | * | 8/2002 | Gubernator et al. | 422/102 |
| 6,486,401 B1 | * | 11/2002 | Warhurst et al. | 174/66 |
| 2001/0000635 A1 | | 5/2001 | Reo | |
| 2001/0007642 A1 | | 7/2001 | Feiglin | |
| 2002/0003945 A1 | | 1/2002 | Hall et al. | |
| 2002/0006361 A1 | | 1/2002 | Sanadi | |
| 2002/0021986 A1 | | 2/2002 | McCall et al. | |
| 2002/0028507 A1 | * | 3/2002 | Heimberg et al. | 435/305.3 |
| 2002/0039545 A1 | | 4/2002 | Hall et al. | |
| 2002/0054833 A1 | | 5/2002 | Qu et al | |

* cited by examiner.

MICROPLATE COVER ASSEMBLY

BACKGROUND OF THE INVENTION

1. Field of the Invention

The present invention relates generally to the field of microplates and, more specifically, to a microplate cover assembly which provides a removable seal and is compatible with manual or robotic handling systems.

2. Background Information

Microplates are commonly used in a variety of test procedures. During such procedures, it may be desirable or necessary to seal the wells contained in the microplates in order to produce appropriate test conditions, prevent cross-contamination among wells, prevent sample leakage during transportation or storage, or prevent human exposure to hazardous samples. In addition, some test procedures, including high throughput screening, may require a large number (e.g., on the order of hundreds or thousands) of microplates to be handled by robotic equipment. In such an environment, it is essential is that the process of engaging or disengaging the microplate's seal does not interfere with the robotic equipment or unduly reduce the throughput of the system.

Conventional approaches to sealing microplates suffer from significant disadvantages. First, many conventional seals do not provide a uniform seal across all of the microplate's wells. This is often caused by a non-uniform distribution of force which is used to maintain the seal. In more serious cases, this flaw may result in incomplete sealing of some wells, thereby compromising test results or creating a hazardous condition. Second, conventional seals are typically designed to be engaged and disengaged from the microplate by hand and are not suitable for use with robotic equipment needed for high throughput screening.

SUMMARY OF THE INVENTION

In brief summary, the present invention provides a microplate cover assembly which provides a substantially uniform, secure, reliable seal of the microplate's wells, and which is well suited for use with robotic handling systems. The assembly includes a layer of sealing material, a pressure plate and a cover. The cover is shaped so as to exert a compressive force on the pressure plate when the assembly is engaged with the microplate. The pressure plate, in turn, disperses the compressive force in a generally uniform manner across the layer of sealing material. The cover, pressure plate and sealing layer are preferably attached to each other by adhesive or other type of fastener.

In a preferred embodiment, the cover includes a number of laterally-extending tabs which serve as gripping points for a robotic microplate handling system. Such tabs enable a robotic manipulator to engage the cover with a microplate, disengage the cover, and transport the engaged cover/microplate as a unit. The cover may also include a number of downwardly-extending tabs which enable multiple units to be stacked in a stable manner. The embodiment is designed to not obstruct the surfaces of the microplate where barcodes are typically applied. The pressure plate may include features for holding the assembly for robotic handling.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
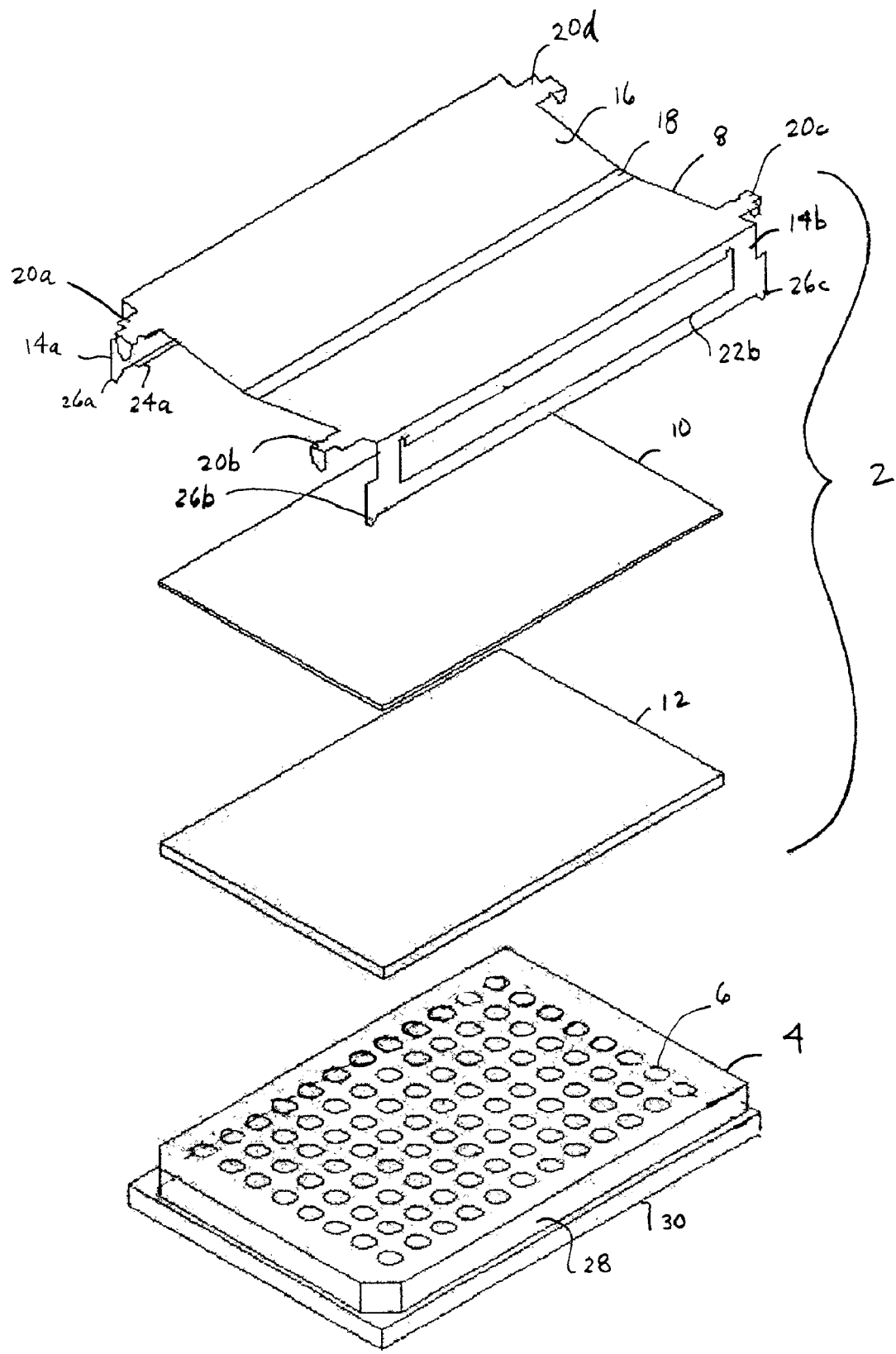
FIG. 1 is an exploded, perspective view of a microplate cover assembly constructed in accordance with a preferred embodiment of the present invention.

FIG. 1 shows a microplate cover assembly 2 which may be used to seal wells 6 contained in a microplate 4. Microplate 4 is of conventional design and is available from any of a number of commercial sources in any of 24, 96 or 384 well formats, and may include others. It should be understood that the term "microplate" as used herein includes, but is not limited to, shallow well, deepwell, half deepwell and PCR type plates as well as minitube racks. It should also be understood that the present invention is not limited to any particular matrix size.

A cover 8 is disposed on a pressure plate 10. Pressure plate 10 is disposed on a layer of sealing material 12, which in turn is disposed on the top surface of microplate 4. Cover 8 includes an angled top surface 16 with a narrow, generally flat portion 18 extending laterally along the central axis of the cover. Cover 8 includes sides 14a and 14b which are generally orthogonal to top surface 16. Extending laterally from the edges of top surface 16 are tabs 20a–20d which function as gripping points for a robotic handling system (not shown).

Each side 14a, 14b includes a generally rectangular aperture, only one of which, 22b, is visible in this figure. Such apertures allow side surface 28 of microplate 4 to remain visible when assembly 2 is engaged with the microplate. Thus, identifying marks or bar code labels, which are often located on side surface 28, are not obscured once microplate 4 is sealed. In additions, such apertures increase the flexibility of sides 14a, 14b, thereby reducing the force necessary to either engage or disengage cover 8 from microplate 4.

Each side 14a, 14b also includes an inwardly-extending flange, only one of which, 24a, is partially visible. Such flanges extend laterally for most of the lengths of sides 14a, 14b and, when cover 8 is engaged with microplate 4, support a bottom edge 30 of microplate 4, keeping the microplate from distorting and anchoring the cover to the microplate.

The bottom corner of each side 14a, 14b also includes a foot, three of which, 26a–26c, are visible in this figure. As described in detail below, feet 26 allow multiple cover assembly 2/microplate 4 units to be stacked one upon another.

Cover 8 and pressure plate 10 are preferably constructed from stainless steel or conventional spring steels with corrosion resistant plating or coatings. Layer 12 is preferably constructed from a material sold under the trademark GEON. It will be apparent to those skilled in the art that a wide variety of other suitable materials may be substituted including Techron, EVA, Neoprene, polypropylene or Teflon® films.

In a preferred embodiment, cover 8, pressure plate 10 and sealing layer 12 are joined together by a mechanical arrangement such as swaged over tabs, spot welding or riveting. Pressure plate 10 and sealing layer 12 are preferably joined with a conventional adhesive such as cyano-acrylate or pressure sensitive adhesive suitable for the material being bonded. With its components fastened together, cover assembly 2 may be more easily engaged with and disengaged from microplate 4.

Figure 2:
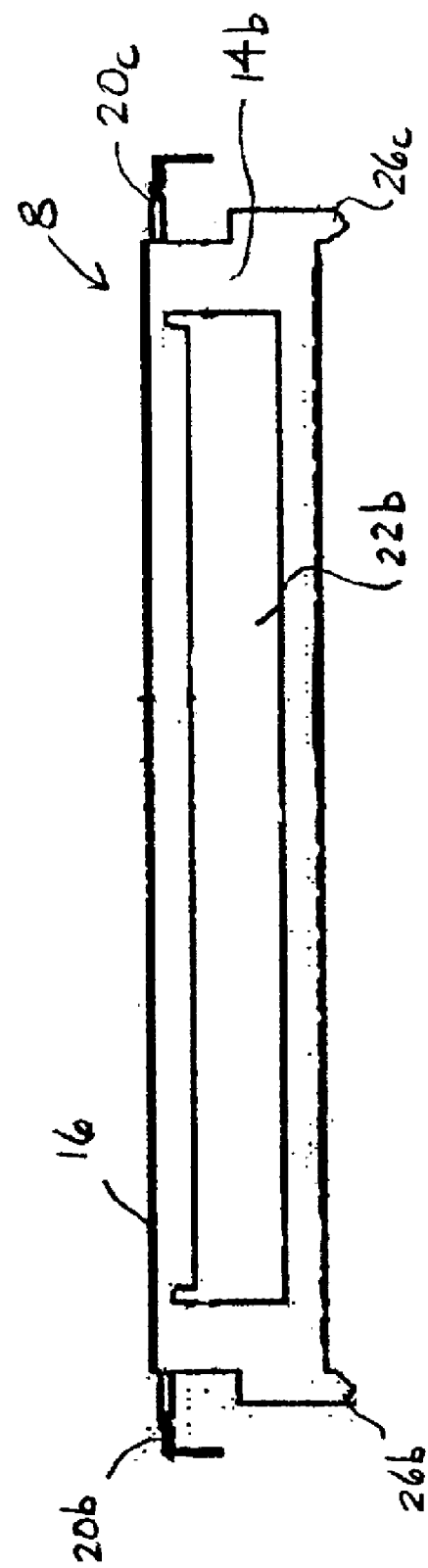
FIG. 2 is a right side elevation of the cover shown in FIG. 1.

Tabs 20b and 20c, feet 26b and 26c, and aperture 22b may be more clearly seen in FIG. 2, which is a right side elevation of cover 8. Tabs 20a–20d may be more clearly seen in FIG. 3, which is a top plan view of cover 8.

Figure 3:
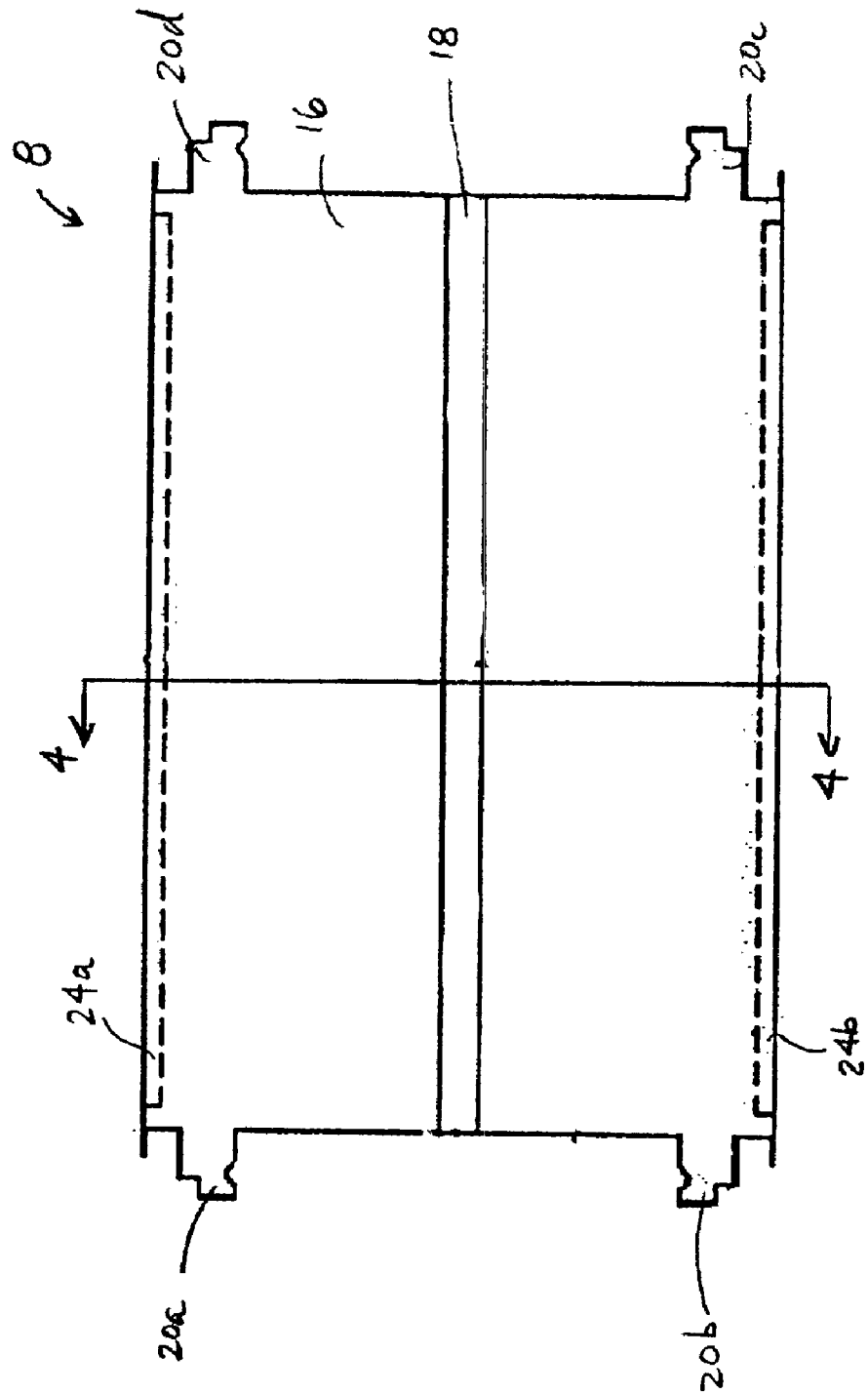
FIG. 3 is a top plan view of the cover shown in FIG. 1.
Figure 4:
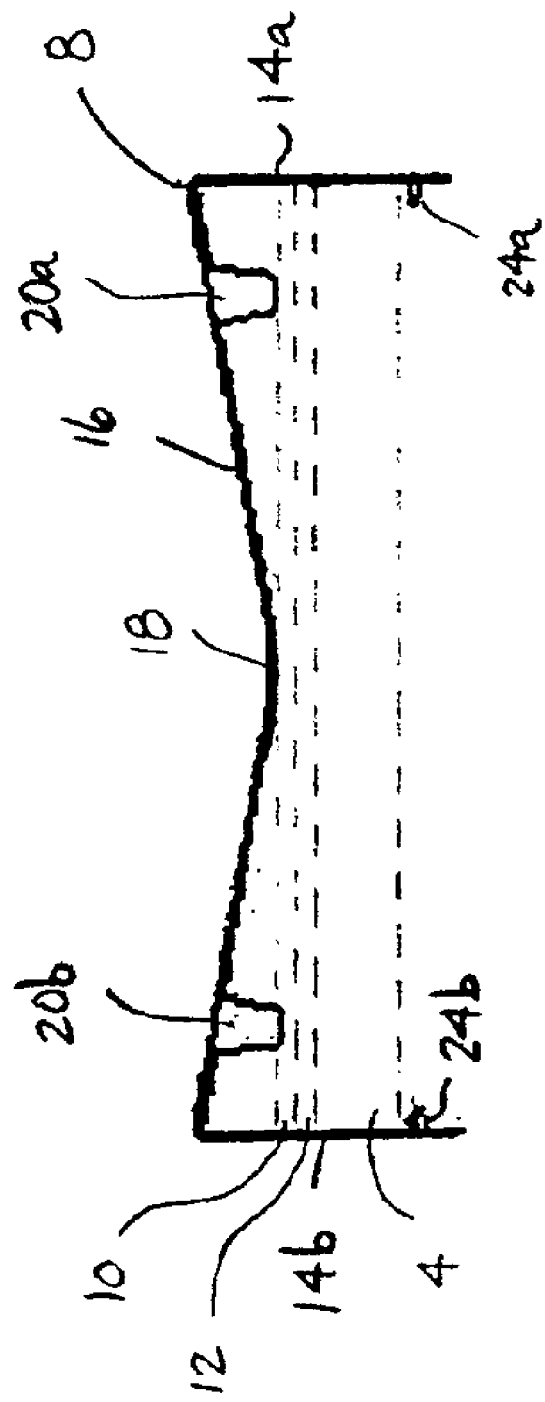
FIG. 4 is a section taken along line 4—4 of FIG. 3.

FIG. 4 is a section taken along line 4—4 of FIG. 3. Microplate 4, pressure plate 10 and sealing layer 12 are shown in phantom as they would generally appear when microplate 4 is sealed. It should be understood that, depending upon the thicknesses of microplate 4, pressure plate 10 and sealing layer 12, as well as the compressive force that is desired, top surface 16 may appear more or less flat than depicted when cover 8 is engaged with microplate 4, either with a plate or without, the sides 14a, 14b remain substantially vertical and consistent in height.

Preferably, cover 8 is engaged with and disengaged from microplate 4 by a robotic manipulator (not shown) which grasps tabs 20a and 20b (or, alternatively, tabs 20c and 20d) or, alternatively, with tabs on pressure plate 10, as shown below in FIG. 6. To engage cover 8 with microplate 4, the robotic manipulator grasps pressure plate 10 and applies a compressive force to cover 8, then grasps tabs 20a, 20b and rotates them slightly in opposite directions so as to force sides 14a, 14b to flex outwardly. This creates sufficient clearance for cover 8 (and, preferably, attached pressure plate 10 and sealing layer 12) to be lowered onto microplate 4 from above. At that point, the robotic manipulator allows the tabs to counter-rotate to their original positions, causing flanges 24a, 24b to slip under the bottom edge of microplate 4. The compressive force on cover 8 is now removed so that cover 8 now exerts a compressive force on pressure plate 10, which disperses that force laterally in a substantially uniform manner, thereby creating a fairly even pressure across sealing layer 12.

To disengage cover 8, a slight downward force is preferably exerted on the top surface 16 of cover 8. Again, a robotic manipulator grasps a pair of adjacent tabs 20 and rotates them slightly so as to clear flanges 24a, 24b from the bottom edge of microplate 4. At that point, cover 8 may be lifted clear from microplate 4.

Figure 5B:
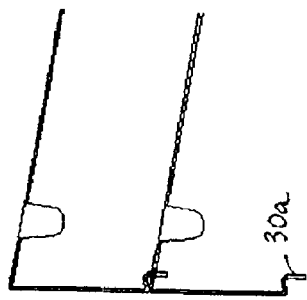
FIG. 5B is a partial section taken along line 5B—5B of FIG. 5A.
Figure 5D:
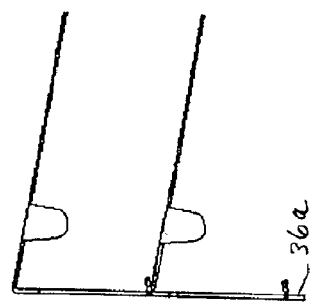
FIG. 5D is a partial section taken along line 5D—5D of FIG. 5C.
Figure 5A:
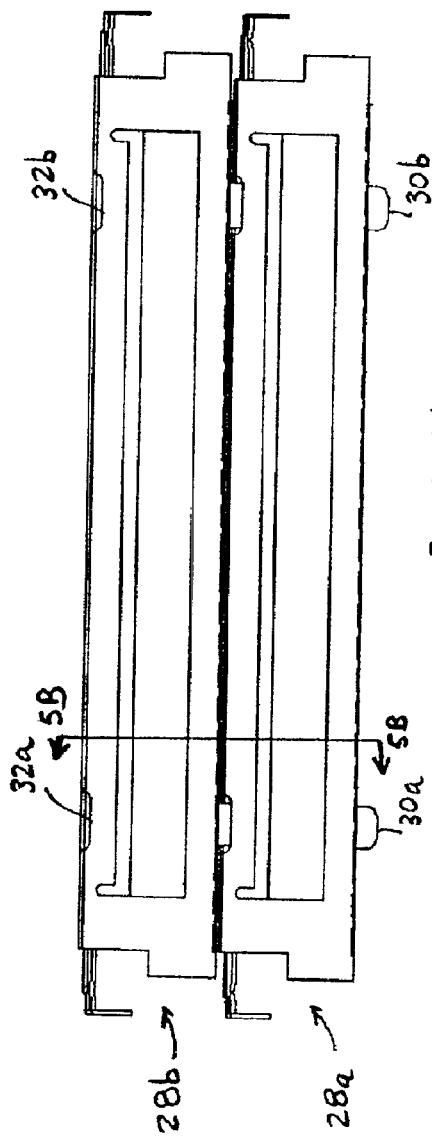
FIG. 5A is a side elevation of an alternative embodiment of stackable microplate cover assemblies.

FIGS. 5A and 5B show an alternative embodiment of the present invention. In cover 28a, two feet 30a, 30b extend from the bottom edge of each side of the cover. Feet 30a, 30b are shaped and dimensioned to engage with slots 32a, 32b of a second cover 28b, thereby allowing such covers to be stacked in a stable manner.

Figure 5C:
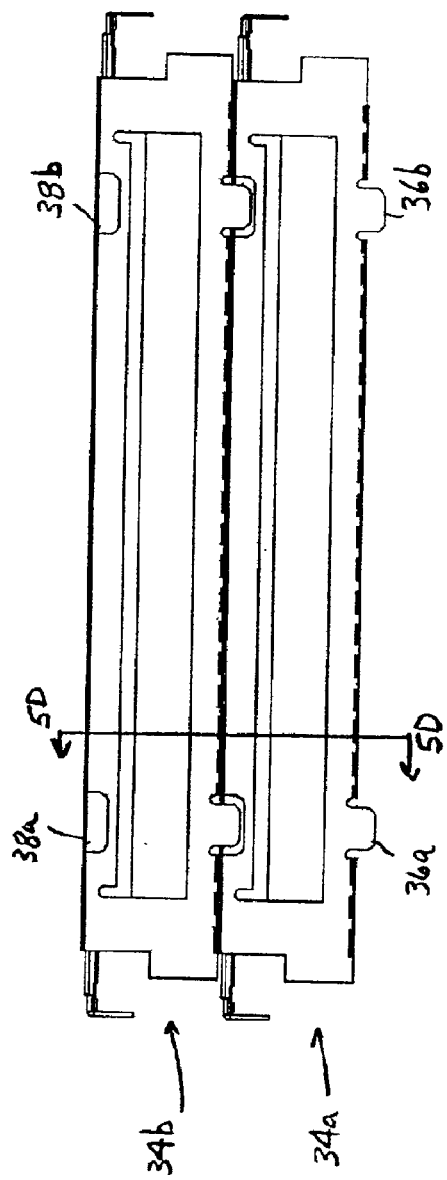
FIG. 5C is a side elevation of another alternative embodiment of stackable microplate cover assemblies.

FIGS. 5C and 5D show a second alternative embodiment of the present invention. Again, two feet 36a, 36b are provided at the bottom edge of each side of cover 34a. Feet 36a, 36b engage with slots 38a, 38b located on a second cover.

Figure 6:
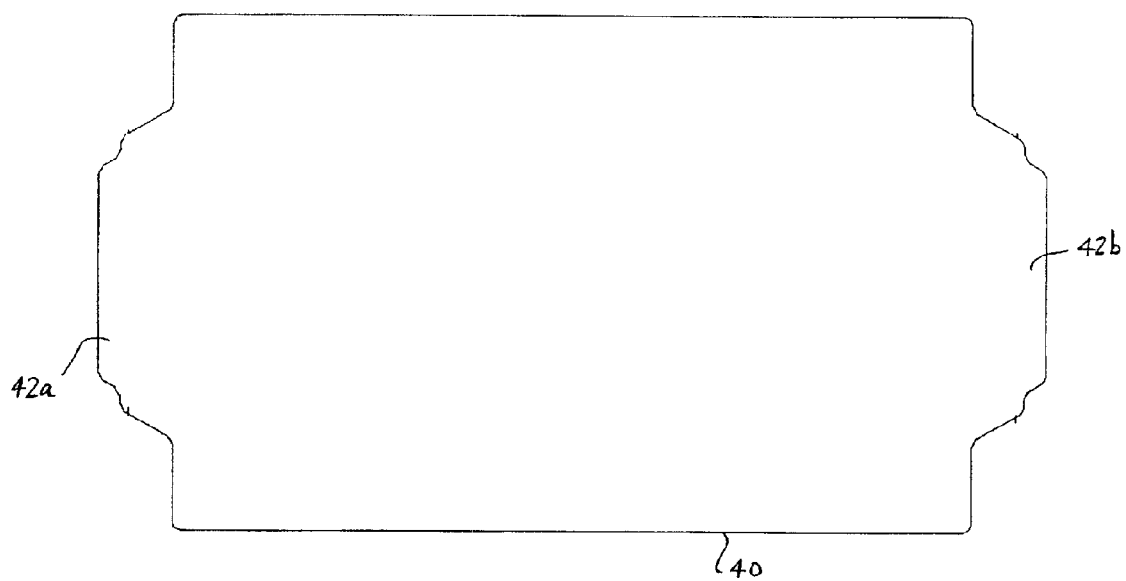
FIG. 6 is a top plan view of an alternative embodiment of the pressure plate shown in FIG. 1.

FIG. 6 shows an alternative embodiment of a pressure plate 40 which includes tabs 42a, 42b for robotic attachment, as described above.

What is claimed is:

1. A cover assembly for a microplate, said assembly comprising:
   a layer of material shaped and dimensioned to removably seal a plurality of well openings of said microplate;
   a pressure plate disposed on said layer of material for dispersing a compressive force in a generally uniform manner across said layer of material;
   a cover having a top and first and second sides, said top shaped so as to generate said compressive force when said cover is engaged with said microplate, said first and second sides each including an inward projection for supporting a bottom edge of said microplate;
   a plurality of vertical tabs extending downward from said projections; and
   a plurality of recesses in said cover assembly that register with said tabs, whereby a plurality of the cover assemblies can be stacked with the vertical tabs of each cover assembly extending down into the recesses of a cover assembly that is disposed beneath.

2. The cover assembly as in claim 1 wherein said top and said pressure plate each include one or more horizontal tabs extending generally parallel to said top and said sides horizontal tabs enabling said cover to be engaged with or disengaged from said microplate by a robotic system.

3. The cover assembly as in claim 1 wherein said first and second sides of said cover include apertures which render at least portions of the side surfaces of said microplate visible when said cover is engaged with said microplate.

4. The cover assembly of claim 1 wherein said pressure plate comprises a generally rectangular piece of metal with robotic access features.

5. The cover assembly of claim 1 wherein said cover top includes a central, longitudinally extending portion contacting said pressure plate and lateral portions extending upwardly from said central portion at their inner edges, said sides extending downwardly from the outer edges of said lateral portions, whereby the lateral portions and the central portion provide a resilient force that bears downward on said pressure plate and upward on the bottom edges of said microplate.

6. The assembly of claim 1 including longitudinal tabs, extending from said first and second sides, whereby said cover may be disengaged from or engaged with said microplate by displacing said longitudinal tabs laterally outwardly or inwardly to move said projections away from or beneath said bottom edges of said microplate.

7. A cover assembly for a microplate, said assembly comprising:
   a layer of material shaped and dimensioned to removably seal a plurality of a microplate's well openings;
   a pressure plate disposed on said layer of material for dispersing a compressive force in a generally uniform manner across said layer of material; and
   a cover having a top and first and second sides, said top including a central, longitudinally extending portion in contact with said pressure plate and lateral portions extending upwardly from central portion at their inner edges, said sides extending downwardly from the outer edges of said planar portions and including projections that extend beneath bottom edges of said microplate;
   whereby said lateral portions and said central portion provide a resilient force that bears downward on said pressure plate and upward on the bottom edges of said microplate.

8. The assembly of claim 7 including longitudinal tabs, extending tabs from said first and second sides, whereby said cover may be disengaged from or engaged with said microplate by displacing said longitudinal tabs laterally outwardly or inwardly to move said projections away from or beneath said bottom edges of said microplate.

9. A cover assembly for a microplate, said assembly comprising:
 a layer of compressible material shaped and dimensioned to removably seal a plurality of a microplate's well openings;
 a pressure plate disposed on said layer of material for dispersing a compressive force in a generally uniform manner across said layer; and
 a cover having a top and first and second sides, said sides extending downwardly from the outer edges of said top and including projections that extend beneath the bottom edges of said microplate, said top bowing upwardly from a central portion thereof to said sides, whereby said top provides a resilient force that bears downwardly on said pressure plate and upwardly on the bottom edges of said microplate.

10. The assembly of claim 9 including longitudinal tabs, extending from said first and second sides, whereby said cover may be disengaged from, or engaged with said microplate by displacing said longitudinal tabs laterally outwardly or inwardly to move said projections away from or beneath said bottom edges of said microplate.

11. The assembly of claim 9 including:
 a plurality of vertical tabs, generally perpendicular to said top, extending downward from said projections; and
 a plurality of recesses in said assembly that register with said vertical tabs, whereby a plurality of cover assemblies can be stacked, with the vertical tabs on a cover extending into the recesses of a cover assembly that is disposed beneath.

* * * * *